US012774906B2

(12) United States Patent
Lechner et al.

(10) Patent No.: US 12,774,906 B2
(45) Date of Patent: Oct. 27, 2026

(54) METHOD AND DEVICE FOR DETERMINING AN ANGLE DIFFERENCE

(71) Applicant: Robert Bosch GmbH, Stuttgart (DE)

(72) Inventors: Benjamin Lechner, Pforzheim (DE); Christoph Schuster, Stuttgart (DE); Lei Chen, Stuttgart (DE); Michael Mueller, Holzgerlingen (DE); Miriam Riederer, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 368 days.

(21) Appl. No.: 18/562,225

(22) PCT Filed: Apr. 29, 2022

(86) PCT No.: PCT/EP2022/061437
§ 371 (c)(1),
(2) Date: Nov. 17, 2023

(87) PCT Pub. No.: WO2022/243007
PCT Pub. Date: Nov. 24, 2022

(65) Prior Publication Data

US 2024/0240971 A1 Jul. 18, 2024

(30) Foreign Application Priority Data

May 21, 2021 (DE) .................... 10 2021 205 258.4

(51) Int. Cl.
*G01D 5/244* (2006.01)

(52) U.S. Cl.
CPC ....... *G01D 5/24476* (2013.01); *G01D 5/2448* (2013.01)

(58) Field of Classification Search
CPC .. G01D 5/24476; G01D 5/2448; H02P 21/32; H02P 21/34; H02P 25/022; H02P 21/16
See application file for complete search history.

(56) References Cited

U.S. PATENT DOCUMENTS 6,984,957 B2 * 1/2006 Tajima .................... H02P 21/26 318/702

FOREIGN PATENT DOCUMENTS

CN 104079215 B 6/2016
DE 102008001408 A1 10/2009

(Continued)

OTHER PUBLICATIONS

Translation of International Search Report for Application No. PCT/EP2022/061437 dated Sep. 1, 2022 (2 pages).

*Primary Examiner* — A. Hunter Wilder
(74) *Attorney, Agent, or Firm* — Michael Best & Friedrich LLP

(57) ABSTRACT

Method (100) and device for determining an angle difference (PhiOffs_opt) between a zero position of a rotor position sensor (210) of an electric machine (220) and an orientation of the permanent magnets of the electric machine (220), wherein the electric machine (220) is controlled by way of field-oriented control and the rotor of the electric machine rotates. The method comprises the steps of: specifying (150) a first d setpoint current value (Id_soll_1) not equal to zero amps and specifying a first q setpoint current value (Iq_soll_1); determining (155) a first d setpoint voltage (Ud_soll_1) and a first q setpoint voltage (Uq_soll_1); specifying (160) a second d setpoint current value (Id_soll_2), wherein the second d setpoint current value (Id_soll_2) corresponds to the value of the first d setpoint current value (Id_soll_1) with the complementary mathematical sign, and specifying a second q setpoint current value (Iq_soll_2), wherein the second q setpoint current value (Iq_soll_2) corresponds to the value of the first q setpoint current value (Iq_soll_1) with the complementary mathematical sign; determining (170) a second d setpoint voltage (Ud_soll_2) and a second q setpoint voltage (Uq_soll_2); determining (175) an angle error (PhiErr_opt)

(Continued)

on the basis of the determined first d setpoint voltage (Ud_soll_1), the first q setpoint voltage (Uq_soll_1); the second d setpoint voltage (Ud_soll_2) and the second q setpoint voltage (Uq_soll_2); determining (180) the angle difference (PhiOffs_opt) on the basis of the angle error (PhiErr_opt).

11 Claims, 3 Drawing Sheets

(56) References Cited

FOREIGN PATENT DOCUMENTS

| | | | | | |
|---|---|---|---|---|---|
| DE | 102008042360 | A1 | | 4/2010 | |
| DE | 102012102898 | A1 | | 10/2013 | |
| DE | 112018001646 | T5 | * | 12/2019 | ............. H02P 21/06 |
| EP | 2192682 | A1 | | 6/2010 | |
| EP | 2770627 | A1 | | 8/2014 | |
| EP | 2770626 | B1 | | 12/2018 | |
| WO | 2017174554 | A1 | | 10/2017 | |

* cited by examiner

METHOD AND DEVICE FOR DETERMINING AN ANGLE DIFFERENCE

BACKGROUND

The invention relates to a method and device for determining an angle difference between a zero position of a rotor position sensor of an electric machine and an orientation of the permanent magnets of the electric machine. The invention further relates to a powertrain with a corresponding device and a vehicle with a powertrain, as well as a computer program and a computer-readable medium.

In electric and hybrid vehicles, electric machines, preferably synchronous machines, are often used as traction or drive machines. To efficiently control an electric machine, especially its drive torque, the angle difference, or offset angle, between the zero position of a rotor position sensor and the orientation of the permanent magnets of the electric machine's rotor must be known. The more precisely this value is known, the more accurately the machine can be controlled. Preferably, the orientation of the permanent magnets of the rotor can thus be aligned with the d-axis of the rotating coordinate system of the field-oriented control for the control of the electric machine. A resolver or an incremental encoder or other position sensor is preferably used as the position sensor for determining the rotor position.

A variety of approaches are known from the prior art in order to determine this offset angle.

One well-known method for doing so is zero current control. In these methods, when a machine is rotating, the current is controlled to zero amps. To control the current to zero amps, the current controller must compensate for the voltage induced in the rotating electric machine, or rotor. Depending on the control deviation of the setpoint current reference variable and the actual current feedback, setpoint voltages result in the steady-state operation as the output variable of the current controller as the manipulated variable, the phase angle of which corresponds to the induced voltage and thus also to the orientation of the permanent magnets of the rotor or the direction of the positive flux direction of the permanent magnets. When determining the offset angle by way of zero current control, disturbance variables falsify the result. One of the most relevant disturbance variables are the differences between the setpoint voltage (Udq_Soll) determined by the current controller and the actual voltage (Udq_Ist) actually applied to the windings of the electric machine. The difference between the determined setpoint voltage (Udq_Soll) and the actual voltage (Udq_Ist) is also called error voltage (Udq_error).

$$Udq\_Ist \neq Udq\_Soll;$$

$$Udq\_Ist - Udq\_Soll = Udq\_error$$

In the zero current control method, at the operating point where the current is controlled to zero amps, the fault voltage is insufficiently known. The latter can therefore not be compensated for at this operating point.

An alternative method is disclosed in DE 10 2008 001 408 A1. The offset angle is determined as a function of the difference between a field angle, an impressed stator magnetic field and a determined sensor angle.

There is a need for methods and devices to calibrate the offset angle.

SUMMARY

Provided is method for determining an angle difference between a zero position of a rotor position sensor of an electric machine and an orientation of the permanent magnets of the electric machine, the electric machine being controlled by way of a field-oriented control, with the rotor of the electric machine rotating. The method comprises the following steps: specifying a first d setpoint current value not equal to zero amps and specifying a first q setpoint current value; determining a resulting first d setpoint voltage and first q setpoint voltage; specifying a second d setpoint current value, whereby the second d setpoint current value corresponds to the value of the first d setpoint current value with complementary mathematical signs, and specifying a second q setpoint current value, whereby the second q setpoint current value corresponds to the value of the first q setpoint current value with complementary mathematical signs; determining a resulting second d setpoint voltage and a second q setpoint voltage; determining an angle error as a function of the determined first d setpoint voltage, the first q setpoint voltage, the second d setpoint voltage and the second q setpoint voltage; determining the angle difference as a function of the angle error.

Provided thereby is a method for determining the angle difference between a zero position of a rotor position sensor of an electric machine and the orientation of the permanent magnets of the electric machine is provided. The electric machine is controlled by way of a field-oriented control. Field-oriented control of electric machines are well known. In this context, alternating variables assumed to be largely sinusoidal (for example, alternating voltages and alternating currents) are not controlled directly in their temporal instantaneous value, but in an instantaneous value adjusted for the phase angle within the period. For this purpose, the recorded alternating variables, for example the actual phase currents of the electric machine, are each transferred to a coordinate system rotating with the frequency of the alternating variables. Within the rotating coordinate system, the alternating variables in the steady-state operation of the electric machine then result in DC variables to which all the usual methods of control engineering can be applied. To determine the position of the rotor, position encoders or rotor position sensors are used, which output an angle signal to determine the rotor relative to the stator. Due to the multiphase phase-shifted alternating currents impressed in the stator, a rotating magnetic field results when the electric machine is operated. The direction of this rotating magnetic field corresponds to the direction of the resulting total flux, which is produced by superimposing the rotor flux generated by the permanent magnets and the stator flux generated by the stator currents. For the control, an exact knowledge of the deviation, i.e., the offset angle or the angle difference, between the angle signal of the rotor position sensor and the actual rotor flux direction, or the orientation of the permanent magnets of the electric machine, is important, since for the control of the electric machine the rotor flux direction is calculated from the angle signal and the offset angle. Within the rotating coordinate system, the d/q coordinate system, which rotates synchronously with the rotor flux and whose d-axis points in the direction of the rotor flux, a stator current is represented as a stator current vector Is, which is characterized by its magnitude and direction. This current vector rotates synchronously with the rotating stator or rotor flux of the electric machine. In the d/q coordinate system, the current vector can be broken down into two components Isd and Isq, which are constant quantities in the steady-state operation. In the case of field-oriented regulation, the actual phase currents Iu, Iv, Iw are consequently recorded, e.g., by means of current sensors. By means of d/q transformation or Park transformation, the three-phase variables are converted into a two-axis coordinate system with the axes d and q. A setpoint current is determined and specified as a reference variable for the control, usually as a function of a desired torque. In the d/q system, a control deviation is determined from the difference between the setpoint current and the d/q actual currents and is made available to the current controller as an input variable. The controller outputs d/q setpoint voltages as the manipulated variable. These d/q setpoint voltages are transformed back into the three-phase system. These three-phase setpoint voltages are provided by means of an inverter for energizing the electric machine and are applied to the individual phases of the electric machine. The rotor of the electric machine rotates during the method of determining the angle difference. For this purpose, the rotor is preferably driven externally, preferably, for example, when a drive axle of a vehicle is coasting under no load or on a test stand, preferably load-free, preferably decoupled from the powertrain.

The method comprises the steps of: specifying a first setpoint current value as a reference variable, with a first d setpoint current value not equal to zero amps being specified in the d/q system and a first q setpoint current value. determining a first resulting or resulting d/q setpoint voltage as a manipulated variable of the current controller, a first d setpoint voltage and a first q setpoint voltage being determined in the d/q system. specifying a second setpoint current value as a reference variable, with a second d setpoint current value and a second q setpoint current value being specified in the d/q system. The second d setpoint current value corresponds to the value of the first d setpoint current value with a complementary mathematical sign, and the second q setpoint current value also corresponds to the value of the first q setpoint current value with a complementary mathematical sign. A second set or resulting d/q setpoint voltage is determined as the manipulated variable of the current controller, with a second d setpoint voltage and a second q setpoint voltage being determined in the d/q system. The setpoint currents are preferably specified by means of constant setpoint current values. The setpoint currents can preferably also be specified as alternating variables, the mean values of which correspond to a specified setpoint current value. Alternating variables can then preferably also be set as setpoint voltages, the mean values of which are determined as setpoint voltage. Furthermore, an angle error is determined as a function of the determined first d setpoint voltage, the first q setpoint voltage, the second d setpoint voltage and the second q setpoint voltage. Finally, the angle difference is determined as a function of the angle error. The angle difference determined is preferably fed to the current controller for further regulation of the electric machine.

A method for determining an angle difference between a zero position of a rotor position sensor of an electric machine and an orientation of the permanent magnets of the electric machine is advantageously provided. A closed-loop control solution enables the angle difference to be determined precisely without measuring the phase voltages. The higher quality compared to the known methods results from the fact that the error voltages and the setpoint current are point-symmetrical to the origin for small currents. By specifying two setpoint currents with opposite mathematical signs ((Id_soll_1, Iq_soll_1), (−Id_soll_1, −Iq_soll_1)), error voltages also result (Udq_error(Id_soll_1, Iq_soll_1), Udq_error(−Id_soll_1, −Iq_soll_1)) with opposite mathematical signs:

$$\text{Udq\_error(Id\_soll\_1, Iq\_soll\_1)} = -\text{Udq\_error}(-\text{Id\_soll\_1}, -\text{Iq\_soll\_1}).$$

In mathematical terms, the following results for the error voltages:

$$\text{Ud\_error}(Id, Iq) = -\text{Ud\_error}(-Id, -Iq)\ und\ \text{Uq\_error}(Id, Iq) = -\text{Uq\_error}\ (-Id, -Iq)$$

For the actual applied actual stresses, the result is:

$$\text{Ud\_Ist1} = \text{Ud\_soll\_1} + \text{Ud\_error};\ \text{Ud\_Ist2} = \text{Ud\_soll\_2} - \text{Ud\_error};$$

$$\text{Uq\_Ist1} = \text{Uq\_soll\_1} + \text{Uq\_error};\ \text{Uq\_Ist2} = \text{Uq\_soll\_2} - \text{Uq\_error};$$

When the two actual voltages are added together, the symmetrical error voltages approximately cancel each other out. The result is:

$$\text{Ud\_soll\_1} + \text{Ud\_soll\_2} = \text{Ud\_Ist1} + \text{Ud\_Ist2}$$

$$\text{Uq\_soll\_1} + \text{Uq\_soll\_2} = \text{Uq\_Ist1} + \text{Uq\_Ist2}$$

When taking these relationships into account when determining the angle difference, the error influence of the error voltage is minimized as a result of this.

In another embodiment of the invention, the first q setpoint current value equal to zero amps is specified.

When the first setpoint current value is specified as the reference variable, the first d setpoint current value is specified as not equal to zero amps in the d/q system and the first q setpoint current value is specified as equal to zero amps.

Advantageously, an alternative method is provided which generates no torque or only a small torque during execution.

In another embodiment of the invention, the angle error is determined as a function of the arctangent of the quotient of a first sum of the first d setpoint voltage and the second d setpoint voltage and a second sum of the first q setpoint voltage and the second q setpoint voltage.

To determine the angle error, an arc tangent of a quotient is formed. The numerator of the quotient is a first sum of the first d setpoint voltage and the second d setpoint voltage. The denominator of the quotient is a second sum of the first q setpoint voltage and the second q setpoint voltage.

Mathematically, this results in:

$$\text{PhiErr\_opt} = a\tan\big((\text{Ud\_soll\_1} + \text{Ud\_soll\_2})/(\text{Uq\_soll\_1} + \text{Uq\_soll\_2})\big)$$

Advantageously, a calculation rule is provided for determining the angle error as a function of the variables of the current controller.

In another embodiment of the invention, the method comprises a further step: determining the angle difference as a function of a specified angle difference.

In the event that a specified angle difference, in particular a somewhat less precise specified angle difference, is already known in the system, the angle difference is calculated as a function of the specified angle difference.

Advantageously, a method for a more accurate determination of the angle difference is provided.

In another embodiment of the invention, the predetermined angle difference is specified as a function of a predetermined angle error. In particular, the specified angle difference is determined as a function of a difference of a sensor angle difference and a predetermined angle error. For example, a sensor angle difference is a value that describes the mounting position of a rotor position sensor relative to the orientation of the permanent magnets of the electric machine or a zero position of the rotor, or a value specific to the rotor position sensor that describes a sensor signal deviation relative to the orientation of the permanent magnets of the electric machine or a zero position of the rotor.

Advantageously provided is a method for determining the specified angle difference.

In another embodiment of the invention, the determination of the specified angle error is performed as a function of a zero current control or test pulse method.

A zero current control is described by way of example in the introduction, and a test pulse method is known, e.g., from publication DE 10 2008 042 360 A1.

Advantageously provided a method for determining the specified angle error.

In another embodiment of the invention, the angle difference is determined as a function of the difference between the specified angle difference and the angle error.

The invention further relates to a device for determining an angle difference between the zero position of a rotor position sensor of an electric machine and the orientation of the permanent magnets of the electric machine, whereby the electric machine is controlled by way of a field-oriented control, and the rotor of the electric machine rotates, with a logic unit being configured to perform a method described hereinabove.

The device for determining an angle difference between the zero position of a rotor position sensor of an electric machine and the orientation of the permanent magnets of the electric machine comprises a logic unit which is configured to both preset the reference variables, preferably the setpoint current values, to the current controller and to determine or read out the manipulated variable of the current controller, preferably the setpoint voltages, and to perform the calculations described for determining the angle difference.

Advantageously provided is a device for determining an angle difference between the zero position of a rotor position sensor of an electric machine and the orientation of the permanent magnets of the electric machine. The achievable accuracy is very high compared to known solutions and does not require measurement of phase voltages on the electric machine.

Furthermore, the invention relates to a powertrain comprising a device as described. In particular, the powertrain comprises power electronics, an electric drive and/or a battery for supplying the electric drive with electrical energy. Such a powertrain is used, e.g., to drive an electrical vehicle. Safe operation of the powertrain is enabled by means of the method and the device.

The invention further relates to a vehicle having a powertrain as described. Advantageously thus provided is a vehicle which comprises a device for determining an angle difference between the zero position of a rotor position sensor of an electric machine and the orientation of the permanent magnets of the electric machine.

The invention further relates to a computer program comprising instructions which cause the described device to perform the method steps described. Or, the computer program comprises instructions that, when performed by a computer, cause the computer to perform the method steps described thus far.

Furthermore, the invention relates to a computer-readable medium on which the computer program is stored. Or, a computer-readable storage medium comprises instructions that, when performed by a computer, cause the computer to perform the steps of the method described thus far.

It is understood that the features, properties, and advantages of the method according to the invention apply or are correspondingly applicable to the device, or to the powertrain and vehicle, and vice versa.

Further features and advantages of embodiments of the invention follow from the subsequent description with reference to the accompanying drawings.

BRIEF DESCRIPTION OF THE DRAWINGS

The invention will be explained in further detail hereinafter with reference to the drawings.

DETAILED DESCRIPTION

Figure 1:
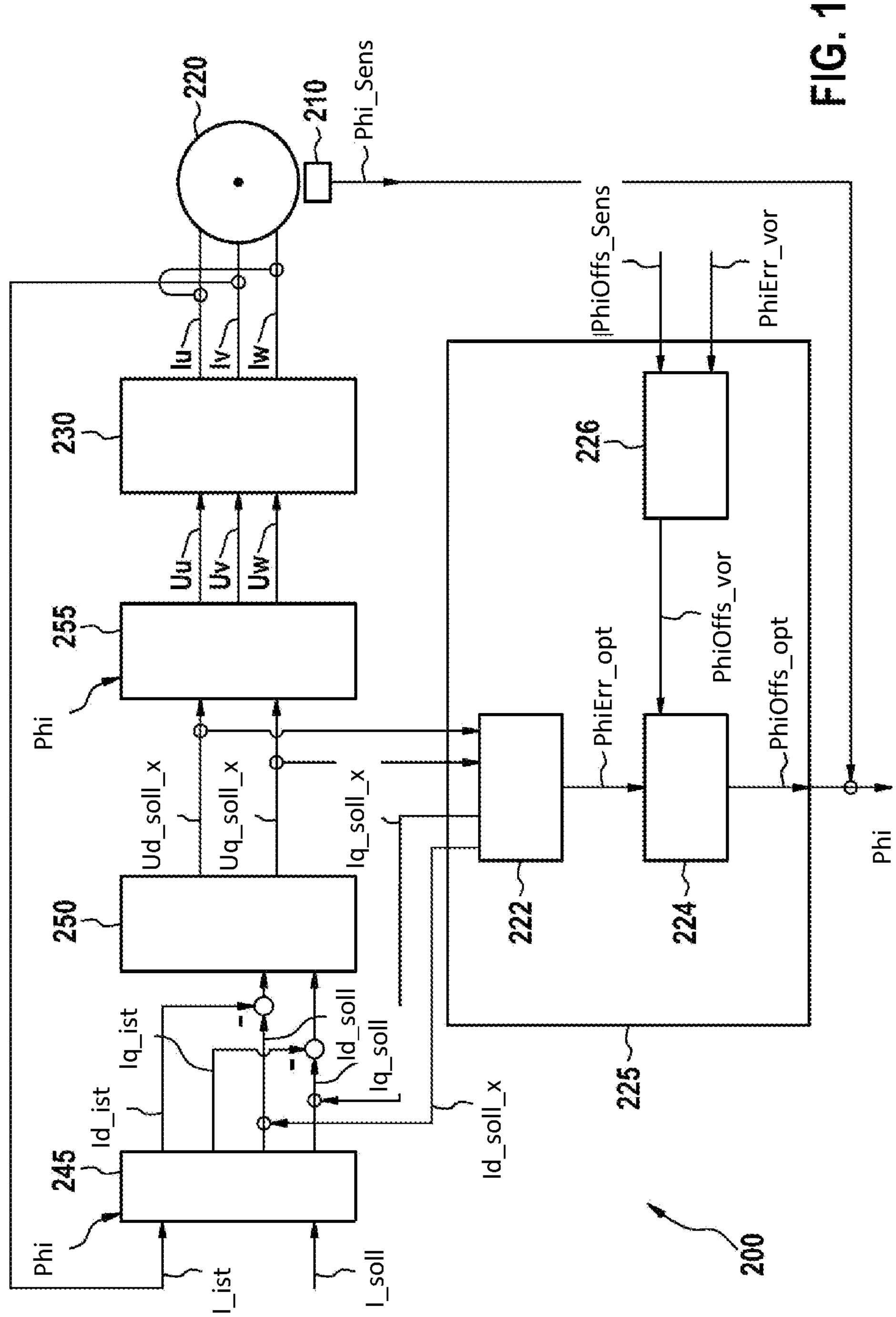
FIG. 1 a schematic representation of a device for determining an angle difference between the zero position of a rotor position sensor of an electric machine and the orientation of the permanent magnets of the electric machine FIG. 2 A schematic flowchart for a method of determining an angle difference between the zero position of a rotor position sensor of an electric machine and the orientation of the permanent magnets of the electric machine.

FIG. 1 shows a device 200 for determining an angle difference PhiOffs_opt between the zero position of a rotor position sensor 210 of an electric machine 220 and the orientation of the permanent magnets of the electric machine 220. The rotor position sensor 210 outputs the signal Phi_Sens. Preferably, an angle signal Phi is determined from the signal Phi_Sens and the determined angle difference PhiOffs_opt, which is used for the control of the electric machine. The electric machine 220 is controlled by way of a field-oriented control. In particular, the field-oriented control comprises a d/q transformation 245, a current controller 250, and an inverse d/q transformation 255, also called a reverse transformation. Preferably, the field-oriented control uses the d/q transformation 245 to transform a specified reference variable, for example a setpoint current I_soll, into the d/q system, or the setpoint current of the field-oriented control is specified directly as a d/q variable, i.e., Id_soll and Iq_soll. The d/q transformation is preferably performed as a function of the angle signal Phi. In the d/q system, a control deviation is determined from the difference between the setpoint current Id_soll, Iq_soll and the d/q actual currents Id_ist, Iq_ist and provided to the current controller 250 as an input variable. The controller outputs setpoint voltages in the d/q system, Ud_soll and Uq_soll, as manipulated variables. These d/q setpoint voltages are transformed back to the three-phase system by means of the inverse d/q transformation 255. The reverse transformation is preferably performed as a function of the angle signal Phi. The three-phase setpoint voltages Uu, Uv, Uw are provided by means of an inverter 230 for energizing the electric machine and applied to the individual phases of the electric machine. Actual currents Iu, Iv, Iw result at the windings of the electric machine 220, which are detected, for example by means of current sensors, and fed to the field-oriented control. By means of the d/q transformation 245 they are transferred into the d/q system. There, as described hereinabove, they are fed to the differential formation, based on the setpoint current and the d/q actual currents, in order to determine the control deviation. The device 200 comprises a logic unit 225, in particular a computing unit. The logic unit 225 is configured to output and preset a first d setpoint current value Id_soll_1 not equal to zero amps by means of an input/output unit 222. In particular, the first d setpoint current value Id_soll_1 is specified as the d setpoint current of the field-oriented control, preferably in the d/q system. Likewise, a first q setpoint current value Iq_soll_1 is output and specified. In particular, the first q setpoint current value Iq_soll_1 is specified as the q setpoint current of the field-oriented control, preferably in the d/q system. The logic unit 225 is further configured to read in or determine a first d setpoint voltage Ud_soll_1 and a first q setpoint voltage Uq_soll_1 by means of the input/output unit 222. This first d setpoint voltage Ud_soll_1 and the first q setpoint voltage Uq_soll_1 are the output variables of the current controller 250, in particular when the specified d and q setpoint current values are adjusted. The logic unit 225 is further configured to output and specify a second d setpoint current value Id_soll_2 not equal to zero amps by means of the input/output unit 222. In particular, the second d setpoint current value Id_soll_2 is specified as the d setpoint current of the field-oriented control, preferably in the d/q system. Likewise, a second q setpoint current value Iq_soll_2 is output and specified. In particular, the second q setpoint current value Iq_soll_2 is specified as the q setpoint current of the field-oriented control, preferably in the d/q system. The logic unit 225 is further configured to read in or determine a second d setpoint voltage Ud_soll_2 and a second q setpoint voltage Uq_soll_2 by means of the input/output unit 222. This second d setpoint voltage Ud_soll_2 and the second q setpoint voltage Uq_soll_2 are the output variables of the current controller 250, in particular when the specified d and q setpoint current values are adjusted. The logic unit 225 is further configured to determine, by means of the input/output unit 222, an angle error PhiErr_opt as a function of the determined first d setpoint voltage Ud_soll_1, the first q setpoint voltage Uq_soll_1, the second d setpoint voltage Ud_soll_2, and the second q setpoint voltage Uq_soll_2. The logic unit 225 is further configured to determine and output the angle difference PhiOffs_opt as a function of the angle error PhiErr_opt by means of a determination unit 224. Preferably, the signal Phi_Sens of the angle position sensor is corrected with the determined angle difference PhiOffs_opt. This results preferably in the angle signal Phi, which is used to control the electric machine. Preferably, the input/output unit 222 outputs and specifies a first q setpoint current value Iq_soll_1 equal to zero amps. Preferably, the input/output unit 222 determines the angle error PhiErr_opt as a function of the arctangent of the quotient of the sum of the first d setpoint voltage Ud_soll_1 and the second d setpoint voltage Ud_soll_2 and the sum of the first q setpoint voltage Uq_soll_1 and the second q setpoint voltage Uq_soll_2. Preferably, the determination unit 224 determines the angle difference PhiOffs_opt as a function of a specified angle difference PhiOffs_vor. The logic unit 225 is preferably further configured to determine, by means of a specification unit 226, the specified angle difference PhiOffs_vor as a function of a specified angle error PhiErr_vor or as a function of a difference of a sensor angle difference PhiOffs_Sens and the specified angle error PhiErr_vor.

Figure 2:
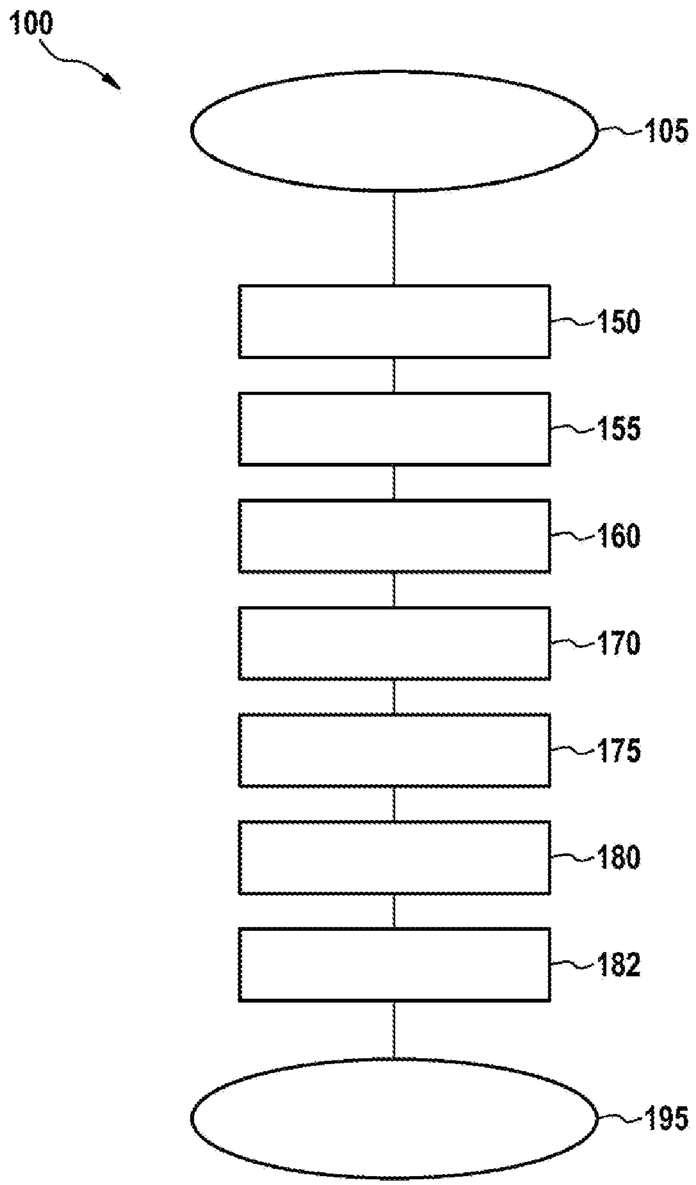

FIG. 2 shows a schematic flowchart for a method 100 for determining an angle difference PhiOffs_opt between a zero position of a rotor position sensor 210 of an electric machine 220 and an orientation of the permanent magnets of the electric machine 220. The electric machine 220 is controlled by way of a field-oriented control, and the rotor of the electric machine 220 rotates. The method 100 starts with step 105. In step 150, a first d setpoint current value Id_soll_1 not equal to zero amps and a first q setpoint current value Iq_soll_1 are specified. In step 155, a first d setpoint voltage Ud_soll_1 and a first q setpoint voltage Uq_soll_1 are determined. In step 160, a second d setpoint current value Id_soll_2 is specified, whereby the second d setpoint current value Id_soll_2 corresponds to the value of the first d setpoint current value Id_soll_1 with complementary mathematical signs, and a second q setpoint current value Iq_soll_2, whereby the second q setpoint current value Iq_soll_2 corresponds to the value of the first q setpoint current value Iq_soll_1 with complementary mathematical signs. In step 170, a second d setpoint voltage Ud_soll_2 and a second q setpoint voltage Uq_soll_2 are determined. In step 175, an angle error PhiErr_opt is determined as a function of the determined first d setpoint voltage Ud_soll_1, the first q setpoint voltage Uq_soll_1, the second d setpoint voltage Ud_soll_2 and the second q setpoint voltage Uq_soll_2. In step 180, the angle difference PhiOffs_opt is determined as a function of the angle error PhiErr_opt. Preferably, in step 182 the angle difference PhiOffs_opt is determined as a function of a specified angle difference PhiOffs_vor. The method ends at step 195.

Figure 3:
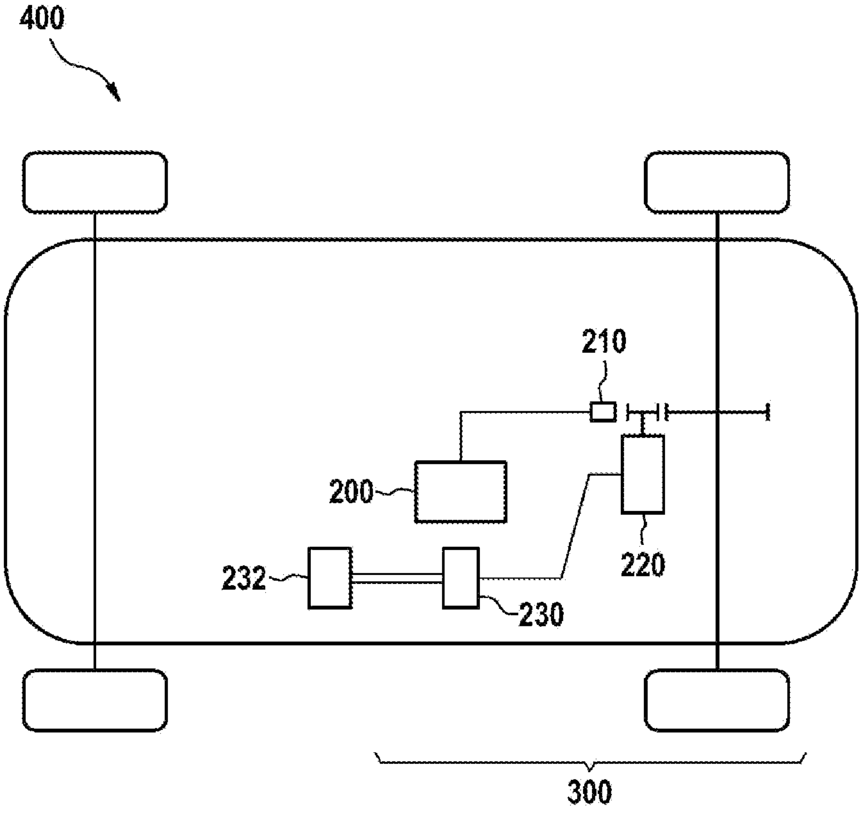
FIG. 3 a schematically represented vehicle comprising a powertrain.

FIG. 3 shows a schematically illustrated vehicle 400 having a powertrain 300. The powertrain comprises a device 200 for determining an angle difference PhiOffs_opt between the zero position of a rotor position sensor 210 of an electric machine 220 and the orientation of the permanent magnets of the electric machine 220. The electric powertrain 300 preferably comprises the electric machine 220, an inverter 230, and/or a battery 232 for supplying electric power to the electric powertrain 300.

The invention claimed is:

1. A method (100) for determining an angle difference (PhiOffs_opt) between a zero position of a rotor position sensor (210) of an electric machine (220) and an orientation of the permanent magnets of the electric machine (220), wherein the electric machine (220) is controlled by way of a field-oriented control, and the rotor of the electric machine (220) rotates, the method comprising the steps of:

- specifying (150) a first d setpoint current value (Id_soll_1) not equal to zero amps and specifying a first q setpoint current value (Iq_soll_1);
- determining (155) a first d setpoint voltage (Ud_soll_1) and a first q setpoint voltage (Uq_soll_1);
- specifying (160) a second d setpoint current value (Id_soll_2), wherein the second d setpoint current value (Id_soll_2) corresponds to the value of the first d setpoint current value (Id_soll_1) with the complementary mathematical sign, specifying a second q setpoint current value (Iq_soll_2), wherein the second q setpoint current value (Iq_soll_2) corresponds to the value of the first q setpoint current value (Iq_soll_1) with the complementary mathematical sign;

determining (170) a second d setpoint voltage (Ud_soll_2) and a second q setpoint voltage (Uq_soll_2);

determining (175) an angle error (PhiErr_opt) on the basis of the determined first d setpoint voltage (Ud_soll_1), the first q setpoint voltage (Uq_soll_1), the second d setpoint voltage (Ud_soll_2), and the second q setpoint voltage (Uq_soll_2);

determining (180) the angle difference (PhiOffs_opt) on the basis of the angle error (PhiErr_opt), and controlling the electric machine (220) according to the determined angle difference (PhiOffs_opt).

2. The method (100) for determining an angle difference (PhiOffs_opt) according to claim 1, wherein the first q setpoint current value (Iq_soll_1) is specified as equal to zero amps.

3. The method (100) for determining an angle difference (PhiOffs_opt) according to claim 1, wherein the determination (175) of the angle error (PhiErr_opt) is performed as a function of the arctangent of the quotient of a first sum of the first d setpoint voltage (Ud_soll_1) and the second d setpoint voltage (Ud_soll_2), and a second sum of the first q setpoint voltage (Uq_soll_1), and the second q setpoint voltage (Uq_soll_2).

4. The method (100) for determining an angle difference (PhiOffs_opt) according to claim 1, comprising the further step of:

determining (182) the angle difference (PhiOffs_opt) as a function of a specified angle difference (PhiOffs_vor).

5. The method (100) for determining an angle difference (PhiOffs_opt) according to claim 4, wherein the specified angle difference (PhiOffs_vor) is determined as a function of a specified angle error (PhiErr_vor).

6. The method (100) for determining an angle difference (PhiOffs_opt) according to claim 5, wherein the specified angle error (PhiErr_vor) is determined as a function of a zero current control or a test pulse method.

7. The method (100) for determining an angle difference (PhiOffs_opt) according to claim 4, wherein the determination of the angle difference (PhiOffs_opt) takes place in dependence of the difference of the specified angle difference (PhiOffs_vor) and the angle error (PhiErr_opt).

8. A device (200) for determining an angle difference (PhiOffs_opt) between the zero position of a rotor position sensor (210) of an electric machine (220) and the orientation of the permanent magnets of the electric machine (220), wherein the electric machine (220) is controlled by way of a field-oriented control, and the rotor of the electric machine (220) rotates, said machine comprising a logic unit (225) configured to specify (150) a first d setpoint current value (Id_soll_1) not equal to zero amps and specify a first q setpoint current value (Iq_soll_1);

determine (155) a first d setpoint voltage (Ud_soll_1) and a first q setpoint voltage (Uq_soll_1);

specify (160) a second d setpoint current value (Id_soll_2), wherein the second d setpoint current value (Id_soll_2) corresponds to the value of the first d setpoint current value (Id_soll_1) with the complementary mathematical sign, specifying a second q setpoint current value (Iq_soll_2), wherein the second q setpoint current value (Iq_soll_2) corresponds to the value of the first q setpoint current value (Iq_soll_1) with the complementary mathematical sign;

determine (170) a second d setpoint voltage (Ud_soll_2) and a second q setpoint voltage (Uq_soll_2);

determine (175) an angle error (PhiErr_opt) on the basis of the determined first d setpoint voltage (Ud_soll_1), the first q setpoint voltage (Uq_soll_1), the second d setpoint voltage (Ud_soll_2), and the second q setpoint voltage (Uq_soll_2);

determine (180) the angle difference (PhiOffs_opt) on the basis of the angle error (PhiErr_opt); and control the electric machine (220) according to the determined angle difference PhiOffs_opt).

9. A powertrain (300) comprising a device (200) according to claim 8.

10. A vehicle (400) comprising a powertrain (300) that includes a device (200) for determining an angle difference (PhiOffs_opt) between the zero position of a rotor position sensor (210) of an electric machine (220) and the orientation of the permanent magnets of the electric machine (220), wherein the electric machine (220) is controlled by way of a field-oriented control, and the rotor of the electric machine (220) rotates, said machine comprising a logic unit (225) configured to specify (150) a first d setpoint current value (Id_soll_1) not equal to zero amps and specify a first q setpoint current value (Iq_soll_1);

determine (155) a first d setpoint voltage (Ud_soll_1) and a first q setpoint voltage (Uq_soll_1);

specify (160) a second d setpoint current value (Id_soll_2), wherein the second d setpoint current value (Id_soll_2) corresponds to the value of the first d setpoint current value (Id_soll_1) with the complementary mathematical sign, specifying a second q setpoint current value (Iq_soll_2), wherein the second q setpoint current value (Iq_soll_2) corresponds to the value of the first q setpoint current value (Iq_soll_1) with the complementary mathematical sign;

determine (170) a second d setpoint voltage (Ud_soll_2) and a second q setpoint voltage (Uq_soll_2);

determine (175) an angle error (PhiErr_opt) on the basis of the determined first d setpoint voltage (Ud_soll_1), the first q setpoint voltage (Uq_soll_1), the second d setpoint voltage (Ud_soll_2), and the second q setpoint voltage (Uq_soll_2);

determine (180) the angle difference (PhiOffs_opt) on the basis of the angle error (PhiErr_opt); and control the electric machine (220) according to the determined angle difference (PhiOffs_opt).

11. A non-transitory computer-readable medium containing instructions that when executed by a computer cause the computer to control a device (200) for determining an angle difference (PhiOffs_opt) between the zero position of a rotor position sensor (210) of an electric machine (220) and the orientation of the permanent magnets of the electric machine (220), wherein the electric machine (220) is controlled by way of a field-oriented control, and the rotor of the electric machine (220) rotates, by specifying (150) a first d setpoint current value (Id_soll_1) not equal to zero amps and specifying a first q setpoint current value (Iq_soll_1);

determining (155) a first d setpoint voltage (Ud_soll_1) and a first q setpoint voltage (Uq_soll_1);

specifying (160) a second d setpoint current value (Id_soll_2), wherein the second d setpoint current value (Id_soll_2) corresponds to the value of the first d setpoint current value (Id_soll_1) with the complementary mathematical sign, specifying a second q setpoint current value (Iq_soll_2), wherein the second q setpoint current value (Iq_soll_2) corresponds to the value of the first q setpoint current value (Iq_soll_1) with the complementary mathematical sign;

determining (170) a second d setpoint voltage (Ud_soll_2) and a second q setpoint voltage (Uq_soll_2);

determining (175) an angle error (PhiErr_opt) on the basis of the determined first d setpoint voltage (Ud_soll_1), the first q setpoint voltage (Uq_soll_1), the second d setpoint voltage (Ud_soll_2), and the second q setpoint voltage (Uq_soll_2);

determining (180) the angle difference (PhiOffs_opt) on the basis of the angle error (PhiErr_opt); and controlling the electric machine (220) according to the determined angle difference (PhiOffs_opt).

* * * * *